United States Patent
Roustant et al.

(10) Patent No.: US 9,027,144 B1
(45) Date of Patent: May 5, 2015

(54) SEMANTIC-BASED BUSINESS EVENTS

(71) Applicant: EMC Corporation, Hopkinton, MA (US)

(72) Inventors: Bruno Roustant, Froges (FR); Satyapal P. Reddy, Fremont, CA (US); Pierre Salagnac, Grenoble (FR); Xavier Pavard, Echirolles (FR)

(73) Assignee: EMC Corporation, Hopkinton, MA (US)

( * ) Notice: Subject to any disclaimer, the term of this patent is extended or adjusted under 35 U.S.C. 154(b) by 18 days.

(21) Appl. No.: 13/722,866

(22) Filed: Dec. 20, 2012

(51) Int. Cl.
*G06F 21/10* (2013.01)
*G06F 9/54* (2006.01)
*G06F 21/60* (2013.01)

(52) U.S. Cl.
CPC .............. *G06F 9/542* (2013.01); *G06F 21/60* (2013.01)

(58) Field of Classification Search
CPC ................................. G06F 21/62; G06F 17/00
USPC .......................................................... 726/26
See application file for complete search history.

(56) References Cited

U.S. PATENT DOCUMENTS

| 6,775,658 | B1 | 8/2004 | Zothner |
| 7,788,235 | B1* | 8/2010 | Yeo ................................ 707/687 |
| 2007/0162913 | A1 | 7/2007 | Moser |
| 2007/0276883 | A1* | 11/2007 | Kumar et al. ................. 707/204 |
| 2008/0255903 | A1* | 10/2008 | Liu et al. ............................ 705/7 |
| 2012/0116836 | A1 | 5/2012 | Flores et al. |

FOREIGN PATENT DOCUMENTS

| EP | 1374028 B1 | 10/2005 |
| EP | 1350200 A4 | 8/2008 |
| EP | 1953690 A2 | 8/2008 |
| EP | 2270725 A2 | 2/2011 |

* cited by examiner

*Primary Examiner* — Teshome Hailu
*Assistant Examiner* — Thanh Le
(74) *Attorney, Agent, or Firm* — Van Pelt, Yi & James LLP

(57) ABSTRACT

Semantic-based processing techniques are disclosed. Semantic processing of content data comprising a content item is performed. A semantic processing-triggered event is triggered based at least in part on the semantic processing. A responsive action is performed in response to the event. The responsive action may include launching a business process, providing a result of semantic processing as an input, or augmenting a content item metadata set with a result of semantic processing.

20 Claims, 5 Drawing Sheets

SEMANTIC-BASED BUSINESS EVENTS

BACKGROUND OF THE INVENTION

Enterprise content management platforms, such as EMC Documentum®, provide the ability to define business event based processing, e.g., by defining a conditional expression based on a business dynamic data model, and an action associated with it, such as starting a process or compiling a report. Such platforms typically enable an event definition to include an indication of contextual data to provide as input to a triggered business process, or to capture in a report. However, the data that satisfies the conditional expression and/or is provided as input in existing system has been limited to existing attributes of a current context data object, for example.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Semantic-based business events are disclosed. In various embodiments, semantic data automatically extracted from document content or metadata is evaluated to generate a business event and trigger associated processing. In some embodiments, a business dynamic data model associated with an enterprise content management system is extended with concepts provided by semantic data, for example, advanced business analytics result data, which can be used in both the business event conditional expression and as input of a generated report or triggered business process, in various embodiments.

Figure 1:
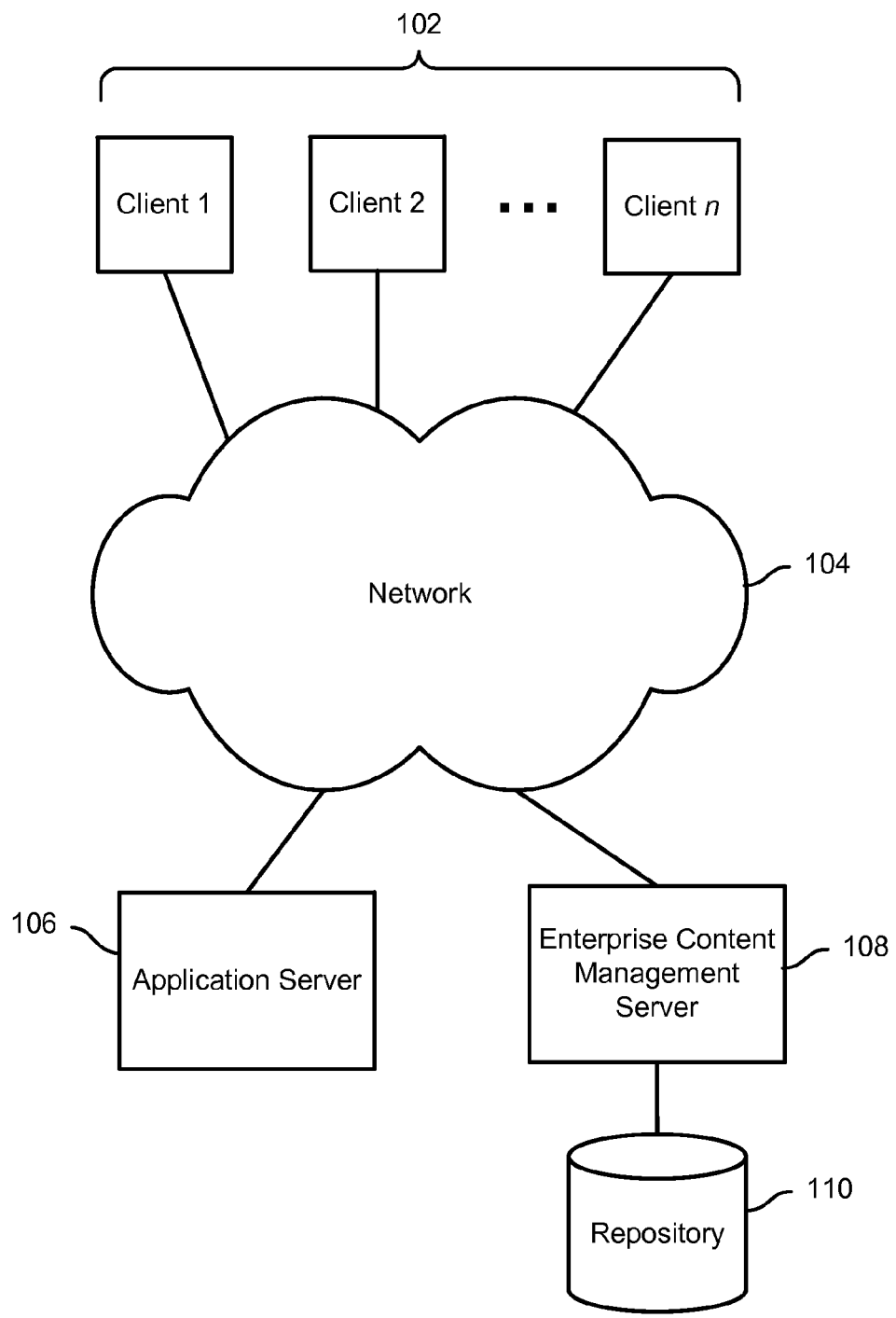
FIG. 1 is a block diagram illustrating an embodiment of a system in which semantic-based business events may be used.

FIG. 1 is a block diagram illustrating an embodiment of a system in which semantic-based business events may be used. In the example shown, a plurality of clients 102 connect via a network 104, e.g., the Internet and/or a corporate local area network (LAN), to an application server 106. In various embodiments, application server 106 runs application that provide access to and/or otherwise use content stored in an enterprise content management system, such as EMC Documentum, which includes in this example an enterprise content management server 108 and a repository 110. In various embodiments, enterprise content management (ECM) server 108 manages content items stored in repository 110 using metadata objects stored in a database and which include as attributes metadata associated with the content items. Examples of content items include, without limitation, documents, files, and other content objects associated with applications running on application server 106, for example, such as content that may be created, modified, or deleted using the application.

In some embodiments, application server 106 provides access to clients 102, via network 104, to an application running on an ECM application framework and/or service running on application server 106. The ECM application framework in some embodiments manages interactions with ECM server 108, for example, to provide the ability to create, store, retrieve, modify, and delete application content items stored in repository 110. In some embodiments, the ECM application framework and/or associated modules and/or services on application server 106 provide the ability to trigger the creation of, create, and advance through one or more phases a business process associated with an application running on application server 106, associated application content items, and/or a broader business process, operation, and/or objective with which the application and/or application content items are associated. In some embodiments, advanced business data analytics capabilities are provided and realized on application server 106. For example, statistics and other numerical or textual analytic capabilities may be provided.

In some embodiments, an application running or capable of running on application server 106 may be created at least in part by a business analyst or other non-programmer using a development tool provided by the ECM vendor, such as the xCP Designer tool provided by EMC Corporation in connection with its Documentum® ECM offerings.

Figure 2:
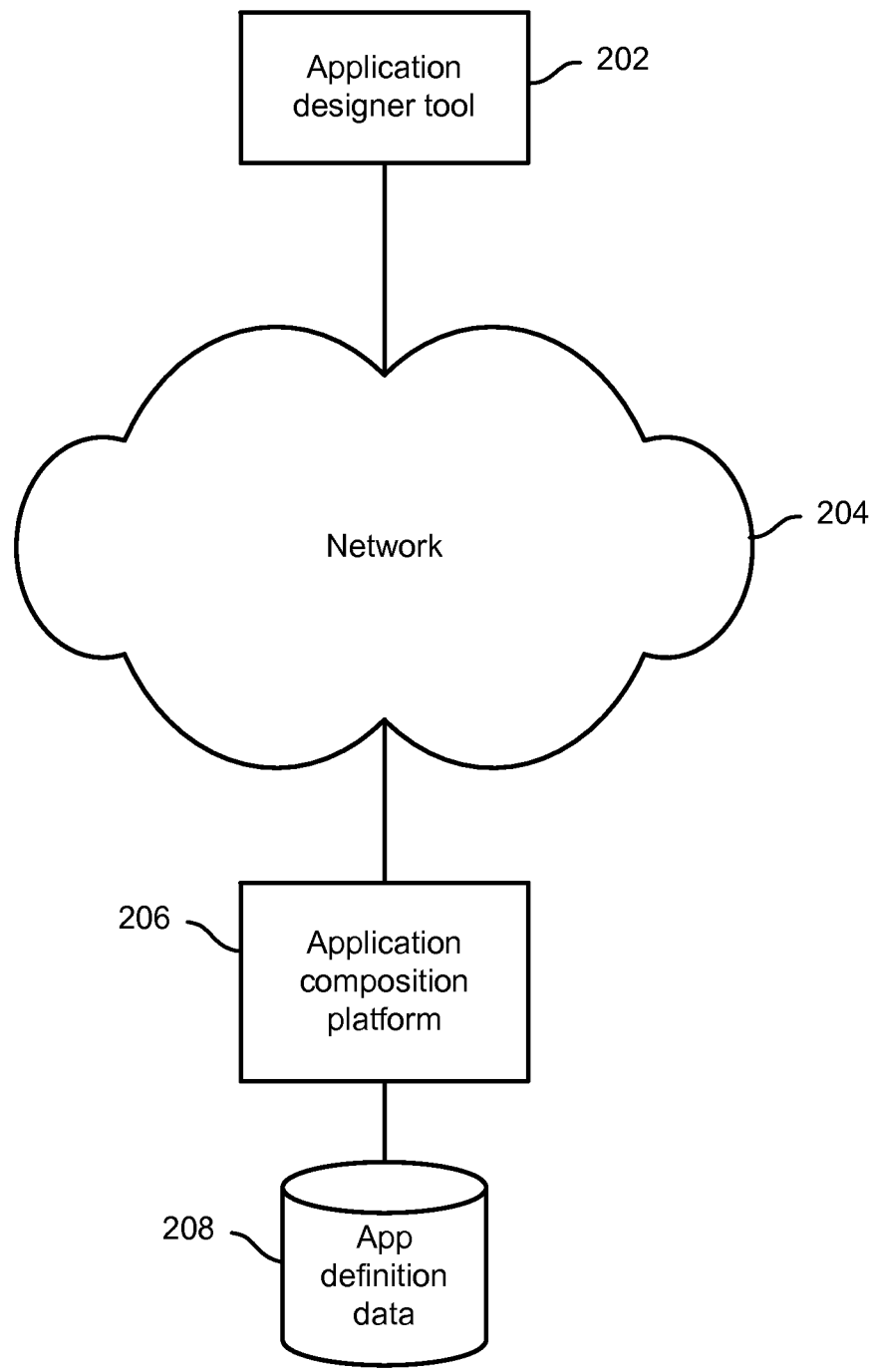
FIG. 2 is a block diagram illustrating an embodiment of a system to develop an ECM application.

FIG. 2 is a block diagram illustrating an embodiment of a system to develop an ECM application. In the example shown, an application design tool 202 is provided to a business analyst or other developer, who may not have (advanced) programming skills. The tool may be provided in the form of client software or browser-executable software and/or via a network 204, as in the example shown in FIG. 2. In some embodiments, a graphical user interface is provided via application design tool 202, to enable the developer to drag and drop items onto a composition area, for example, to define a business data model and/or an associated business process; create an application model to implement and interact with the data model and provide required business processes; indicated desired business data analytics functions and reports and associate them with corresponding parts of the application and/or data model definition; create and modify application user interface pages; define business events and associated responsive actions; etc. In the example shown in FIG. 2, application and/or data model definition information created using application design tool 202 is provided via network 204 to application composition platform 206, which processes the information to generate automatically application code to provide the data model and associated functionality that has been defined using application design tool 202 and to store associated application definitions and/or generated application code in a database or other data store 208. In various embodiments, application composition platform 206 automatically creates, instantiates, identifies, and/or configures resources and elements required to provide and support the application that has been defined, such as by creating and deploying to systems such as application server 106 and ECM server 108 of FIG. 1 elements comprising the application and/or a supporting ECM solution.

Semantic analysis based business events are disclosed. In various embodiments, in the application design process as described herein a developer is provided an interface to define data analytics processing to be performed in connection with the application that is being designed, and to define a business rule to cause responsive action to be taken based at least in part on a result or other output of data analytics processing. Examples of responsive action include, without limitation, triggering and/or otherwise initiating or advancing a business process; providing a result of data analytics processing as an input to a business process; and extending existing content item metadata to include a data analytics processing result and/or other metadata determined based thereon.

Figure 3:
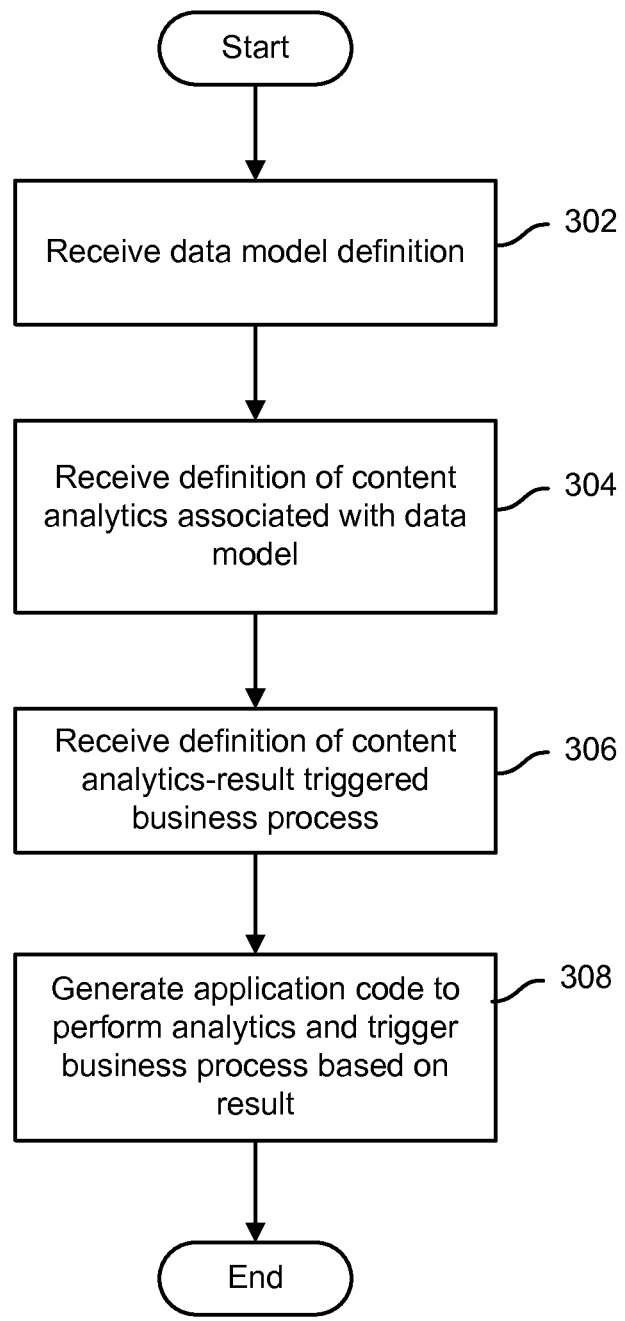
FIG. 3 is a flow chart illustrating an embodiment of a process to create an application.

FIG. 3 is a flow chart illustrating an embodiment of a process to create an application. In the example shown, a data model definition is received (302). For example, a business analyst or other developer provides via an application design tool or other interface a definition of business data objects, the attributes and behavior each object is desired to have, and how the objects relate to each other. A definition of content analytics to be associated with and performed on and/or in connection with the data model is received (304). A definition of one or more content analytics-result triggered and/or informed business processes is received (306). For example, in various embodiments a result of data analytics processing may be evaluated and/or otherwise used to conditionally trigger associated business processing, such as marking a document as "confidential" if a social security number (SSN) or other specified personal identifying data (PID) is found in a document. In various embodiments, one or both of the data analytics processing, the rule or other trigger, and the associated business process may be defined and/or otherwise associated with an application that is being developed using a design tool such as xCP Designer from EMC Corporation.

Figure 4:
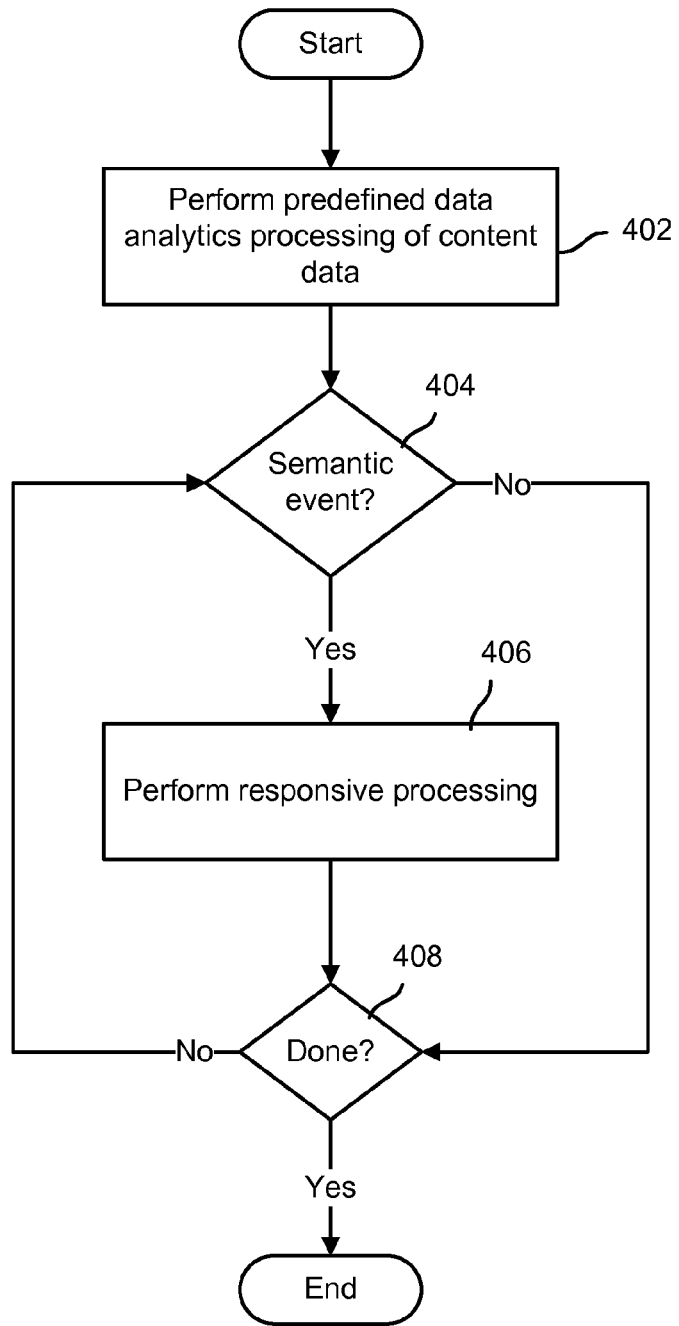
FIG. 4 is a flow chart illustrating an embodiment of a process to generate and respond to business events.

FIG. 4 is a flow chart illustrating an embodiment of a process to generate and respond to business events. In various embodiments, an ECM or other application includes code operable to perform the processing of FIG. 4. In the example shown, predefined data analytics processing of application or other content data is performed (402). In a various embodiments, the data analytics processing may include using regular expression, natural language processing or other techniques to identify, extract, and/or otherwise perform processing with respect to content data included in a document or other content. For example, in some embodiments data values such as names, addresses, account numbers, SSN's or other identifiers or keys may be located within a document. An identified and/or extracted value may be evaluated to determine whether and/or which responsive action may be required. If a data analytics result triggers a business event (404), in the example shown responsive processing is performed (406). Examples of responsive processing that may be taken, without limitation, are provided below. The performance of data analytics processing (402), detected semantic-based business events (404), and taking responsive action (408) may be repeated as subsequent business events occur, until processing is done (408).

Figure 5:
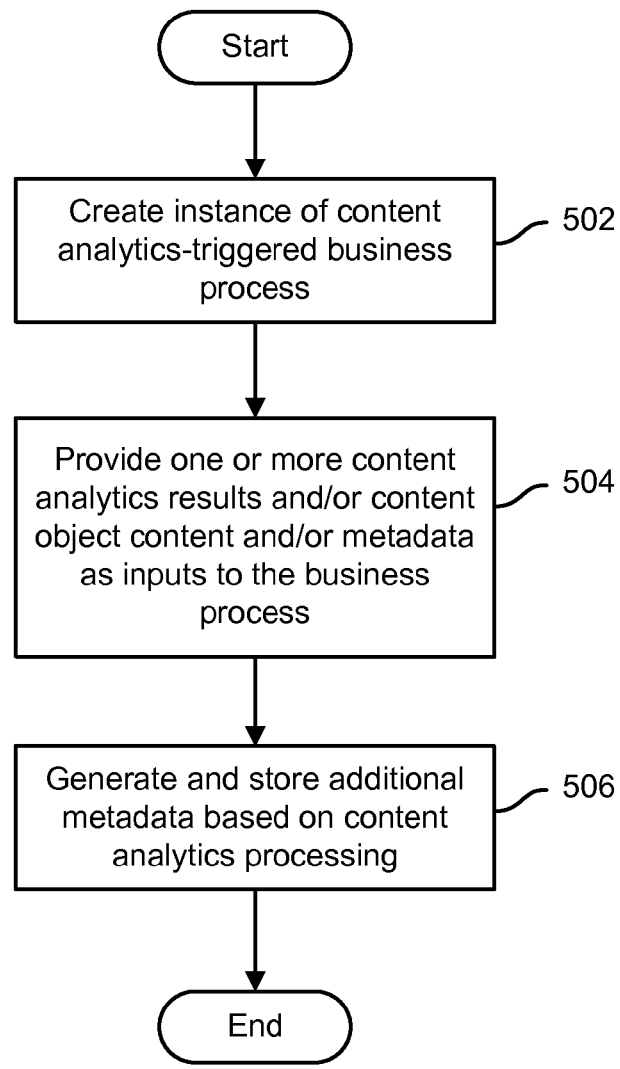
FIG. 5 is a flow chart illustrating an embodiment of a processing in response to a business event.

FIG. 5 is a flow chart illustrating an embodiment of a processing in response to a business event. In the example shown, processing in response to a semantic-based business event may include one or more of creating and initializing an instance of a content analytics-triggered business process (502); providing one or more content analytics results and/or content item (e.g., document) data to a business process or other process as an input (504); and generating and/or storing as additional metadata associated with a document or other content item a content analytics processing result and/or data derived therefrom (506).

In various embodiments, techniques disclosed herein may be used to perform one or more of the following, without coding, to create powerful monitoring applications:

security/confidentiality=>watch arbitrarily complex security patterns and report or trigger a specific security process. For example detect the confidentiality level that should be associated with a document based on rules composed of specific words or phrases to be detected ("confidential", "internal diffusion only", "secret", etc.), with grammatical stemming, associated with proximity detection of sensitive information, and weighted by the number of occurrences and the position in the document.

privacy=>watch SSN, credit card numbers, emails, etc., and report or trigger a specific privacy process. For example detect credit card risk levels based on the co-occurrences of the credit card number, the owner name, or the zip code; given that if all of the foregoing information is grouped, the risk level becomes very high.

anonymization=>watch occurrences of people names, and automatically delete or replace with obfuscation text.

people/organization/place citation or reference=>report evolution over time of people/organization/place references; this can provide a very informative view of citations or trends over time with efficient charts.

retention policy=>based on a dedicated classification taxonomy, assign automatically a retention policy on documents, and trigger a business process to store them appropriately.

repository monitoring=>based on a business adapted classification taxonomy (e.g. taxonomy referencing all projects), assign automatically a category on documents, and report the evolution of the whole document repository over time by providing a summarized view of document categories with efficient charts.

trigger semantically appropriate workflow=>automatically assign a business category to a document, and trigger the appropriate workflow without requiring human decision or far less supervision.

In some embodiments, techniques disclosed herein enhance data model computations to make them asynchronous on demand. Rules are not based simply on a synchronous evaluation of document metadata. Instead the evaluation can be asynchronous when required, when the semantic concepts (SSN, credit card, people, etc.) need to be analyzed first, for example, prior to other processing being performed.

In various embodiments, complex semantic analysis can be done asynchronously, for example by a server analyzing batches of documents. And when the semantic data are available, then business process are evaluated and triggered when applicable.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing data, comprising:
performing semantic processing of content data comprising a content item;
generating a semantic processing-triggered event based at least in part on the semantic processing; and
performing a responsive action in response to the event;
wherein the content item is associated with an application associated with an enterprise content management platform; the content item is stored in a repository associated with the enterprise content management platform; the semantic processing is performed by software code generated in connection with generation of application code for the application based on an application definition of the application; and the semantic processing includes identifying programmatically within the content data a target content, evaluating programmatically the target content in a manner specified in the application definition, and generating programmatically the semantic-processing-triggered event based at least in part on a result of the evaluation.

2. The method of claim 1, wherein performing semantic processing includes performing data analytics processing.

3. The method of claim 1, wherein the content item comprises a document.

4. The method of claim 1, wherein the content item comprises application content.

5. The method of claim 1, wherein the semantic processing includes detecting a content data entity.

6. The method of claim 5, wherein the content data entity comprises one or more of a named entity; and/or an automatic categorization; and a pattern matched by regular expression, including without limitation an account or other identifier, and personal identifying data.

7. The method of claim 1, wherein the semantic processing includes computing statistics with respect to a group of content items that includes said content item.

8. The method of claim 1, wherein generating a semantic process-triggered event includes triggering a business process.

9. The method of claim 8, further comprising providing to the business process as an input a result data of said semantic processing.

10. The method of claim 1, wherein the responsive action includes adding to a set of metadata associated with the content item one or more result value of said semantic processing.

11. The method of claim 1, wherein the responsive action includes advancing an associated business process to a next phase.

12. The method of claim 1, wherein the responsive action includes assigning to the content item one or both of a business category and a content item type.

13. The method of claim 1, wherein the responsive action includes assigning to the content item one or more of the following: a security setting; a security classification; a level of confidentiality; and a privacy setting.

14. The method of claim 1, wherein the responsive action comprises one or both of detecting, removing, and obfuscating private information.

15. The method of claim 1, wherein the responsive action includes obfuscating a personal name or other personal identifying data.

16. A computer system, comprising:
a processor configured to:
perform semantic processing of content data comprising a content item;
generate a semantic processing-triggered event based at least in part on the semantic processing; and
perform a responsive action in response to the event; and
a memory or other data storage device coupled to the processor and configured to store the content data;
wherein the content item is associated with an application associated with an enterprise content management platform; the content item is stored in a repository associated with the enterprise content management platform the semantic processing is performed by software code generated in connection with generation of application code for the application based on an application definition of the application; and the semantic processing includes identifying programmatically within the content data a target content, evaluating programmatically the target content in a manner specified in the application definition, and generating programmatically the semantic-processing-triggered event based at least in part on a result of the evaluation.

17. The system of claim 16, wherein the semantic processing includes detecting a content data entity.

18. The system of claim 16, wherein the responsive action includes instantiating an associated business process.

19. The system of claim 18, wherein the processor is further configured to provide a result data of the semantic processing to the business process instance as an input.

20. A computer program product to process content data, the computer program product being embodied in a non-transitory computer readable storage medium and comprising computer instructions for:
performing semantic processing of content data comprising a content item;
generating a semantic processing-triggered event based at least in part on the semantic processing; and
performing a responsive action in response to the event;
wherein the content item is associated with an application associated with an enterprise content management platform; the content item is stored in a repository associated with the enterprise content management platform the semantic processing is performed by software code generated in connection with generation of application code for the application based on an application definition of the application; and the semantic processing includes identifying programmatically within the content data a target content, evaluating programmatically the target content in a manner specified in the application definition, and generating programmatically the semantic-processing-triggered event based at least in part on a result of the evaluation.

* * * * *